Patented Nov. 6, 1934

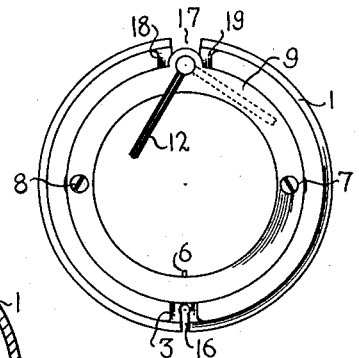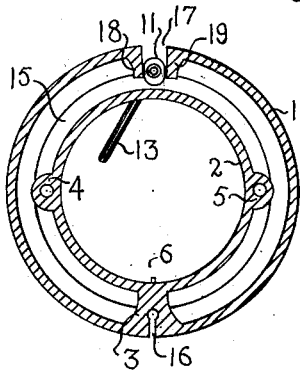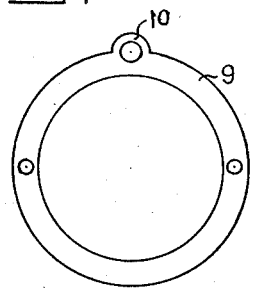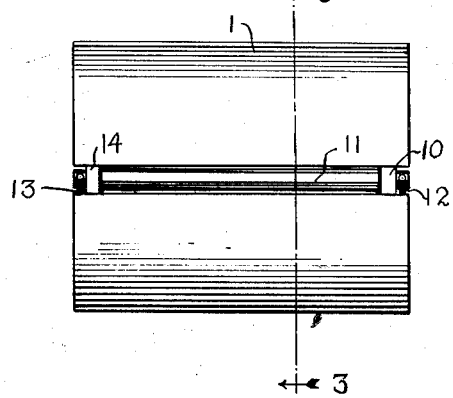

1,979,423

UNITED STATES PATENT OFFICE 1,979,423

COLLAPSIBLE SPOOL FOR MOTION PICTURE FILM

Albert W. Tondreau, Hollywood, Calif., assignor to Warner Bros. Pictures, Inc., New York, N. Y., a corporation of Delaware Application May 16, 1932, Serial No. 611,542

6 Claims. (Cl. 242—72)

This invention relates to collapsible spools, for use with a photographic film, particularly a motion picture film, and has for an object to overcome the defects that have been encountered, when using ordinary solid cast aluminum spools.

When a motion picture "film" magazine is charged for photographing, one compartment is filled with the raw negative stock, and the other compartment contains a take up spool, that is adapted to slip on and off a driven axle. The end of the negative film is threaded through the motion picture camera and attaches to the take up spool, so that, as the film is exposed it is wound tightly around this spool. When the whole film has been exposed, the magazine is taken to the dark room. The exposed film is there taken out of the magazine, and to allow the film to be prepared for developing, the spool is removed therefrom. The film is sometimes wound so tightly around the spool that it is necessary to hammer the two apart. As will be easily understood, this hammering often ruins valuable portions of the film, and at the best is very inconvenient.

The present invention overcomes this difficulty by providing a collapsible take up spool. An added advantage is that the spool is built in such a manner that it can only be slipped on and off the driven axle in the take up compartment of the film magazine when it is in its expanded position, thus insuring that a careless operator cannot put the spool onto the axle, and hence into the magazine while the spool is collapsed.

Other objects and structural details of this invention will be apparent from the following description when read in conjunction with the accompanying drawing, wherein:

Fig. 1 is an end elevation of the collapsible spool of this invention.

Fig. 2 is a side elevation of the spool shown in Fig. 1.

Fig. 3 is a cross sectional view taken on the line 3—3 in Fig. 2.

Fig. 4 is an end elevation of the retaining ring used in this invention.

When a photographer in his dark room wishes to remove the spool upon which the film is wound, it is desirable for the sake of speed and convenience that this may be easily accomplished, and so the spool is made up primarily of two shells, an outer shell 1 and an inner shell 2. These two shells, 1 and 2 form an integral casting of duralumin connected by an intgeral lug or bridge 3 (Fig. 3). The inner shell 2 is a hollow cylinder, having a bore large enough to allow the spool to be slipped over the driven axle, (not shown,) in a take up magazine. Projecting from the inner face of the cylinder 2 is a small pin 6 adapted to ride in a keyway cut in the outer face of the driven axle in order that the axle and the spool will rotate together. Two apertured brackets 4—5, integral with the inner shell 2 are adapted to receive screws 7—8 (Fig. 1) which hold a retaining ring 9 (Figs. 1 and 4) in place. The retaining ring 9 has an apertured bracket 10 integral with it, which rotatably supports the end of an eccentrically shaped rod 11. Two handles 12 (Fig. 1) and 13 (Fig. 3) are fastened respectively to opposite ends of the rod 11. Similar to the ring 9 there is a retaining ring 15 having an apertured bracket 14 (Fig. 2) for the opposite end of the spool.

The lug 3 has a longitudinal dividing aperture 16 which allows for expansion or contraction of the outer cylindrical shell 1.

Directly opposite to the lug 3 there is a longitudinal aperture 17 in the shell 1 and depending from the shell on either side of the aperture 17 are two flanges 18 and 19 which press together on opposite sides of the eccentric rod 11.

In the operation of this device the handles 12 and 13 are moved to the right assuming the position shown in dotted lines in Fig. 1. The movement of the handles 12—13 turns the eccentric rod 11 forcing the halves of the outer shell 1 apart, thus permitting the spool to be slipped over the driven axle, and it is then ready to receive the film.

It will be understood that the handles 12 and 13 in the contracted position of the spool project over the bore of the spool thereby preventing the spool from being fitted over a shaft unless the handles 12 and 13 are moved to the dotted line position shown in Fig. 1 wherein the spool is expanded, and the handles 12 and 13 do not obstruct the bore of the spool and therefore permit the spool to be fitted over a shaft.

The film is narrower than the spool, and is fastened to the spool by slipping a bent end thereof into the aperture 16.

When the reel of film has been exposed, the magazine is taken into the dark room, the film and its spool removed and the handles of the spool 12—13 are moved to the left, permitting the halves of the cylinder 1 to contract to the position shown in Fig. 1 and allowing the spool and the film to be easily separated.

Having thus described the invention what is claimed as new and desired to secure by Letters Patent is:

1. A collapsible spool having expanded and contracted positions such that it can be placed on a shaft in expanded position and cannot be placed on the shaft in contracted position, said spool comprising an outer cylindrical shell and an inner cylindrical shell, means connecting said shells together, and means attached to said inner shell for expanding the periphery of said outer shell, prior to assembly on a shaft.

2. A collapsible spool having expanded and contracted positions such that it can be placed on a shaft in expanded position and cannot be placed on the shaft in contracted position, said spool comprising an outer cylindrical shell and an inner cylindrical shell integrally united and means attached to said inner shell for expanding the periphery of said outer shell prior to assembly on a shaft, said means comprising an eccentric and a handle attached thereto.

3. A collapsible spool comprising an outer shell and an inner shell and means attached to said inner shell for expanding the periphery of said outer shell prior to assembly on a shaft, said means being adapted to allow said spool to be fitted over a shaft when in its expanded position and preventing said spool from being fitted over a shaft unless preset in its expanded position.

4. A collapsible spool for motion picture film, comprising an outer shell having a bore and an inner shell, and means attached to said inner shell for varying the periphery of said outer shell, said means comprising an eccentric and a handle attached thereto, said handle projecting into the bore of said inner shell, when said outer shell is in its contracted position, whereby said spool may not be slipped into position on a driven axle, said handle being movable out of said bore to expand said outer cylinder to permit assembly on the axle.

5. A collapsible spool for motion picture film, comprising a split tubular film receiving member of resilient material, a cam, means for rotatably supporting said cam within said split, and a hand operating device for rotating said cam to expand or contract said spool.

6. A collapsible spool for motion picture film, comprising a split tubular film receiving member of resilient material, said tubular member having a bore, a cam shaft, means for mounting said cam shaft for rotation parallel to the axis of said spool, a cam on said shaft within said split, and a handle for said shaft movable into and out of the bore of said spool.

ALBERT W. TONDREAU.